(12) United States Patent
Pazos et al.

(10) Patent No.: US 10,599,634 B2
(45) Date of Patent: Mar. 24, 2020

(54) SIGNALING WHICH VERSION INFORMATION TO USE ON BYTE-RANGE FILE REPAIR

(71) Applicant: QUALCOMM Incorporated, San Diego, CA (US)

(72) Inventors: Carlos Marcelo Dias Pazos, Carlsbad, CA (US); Nagaraju Naik, San Diego, CA (US); Ralph Akram Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 15/612,460

(22) Filed: Jun. 2, 2017

(65) Prior Publication Data

US 2017/0364550 A1 Dec. 21, 2017

Related U.S. Application Data (60) Provisional application No. 62/351,979, filed on Jun. 19, 2016.

(51) Int. Cl.
| | | |
|---|---|---|
| *G06F 17/00* | (2019.01) | |
| *G06F 16/23* | (2019.01) | |
| *G06F 16/13* | (2019.01) | |
| *H04N 21/435* | (2011.01) | |
| *H04L 29/08* | (2006.01) | |
| *H04N 21/61* | (2011.01) | |
| *H04N 21/6375* | (2011.01) | |

(52) U.S. Cl.
CPC ........ *G06F 16/2365* (2019.01); *G06F 16/137* (2019.01); *H04L 67/02* (2013.01); *H04L 67/06* (2013.01); *H04L 67/16* (2013.01); *H04N 21/435* (2013.01); *H04N 21/6131* (2013.01); *H04N 21/6181* (2013.01); *H04N 21/6375* (2013.01)

(58) Field of Classification Search
CPC .......................... G06F 16/2365; G06F 16/137
See application file for complete search history.

(56) References Cited

FOREIGN PATENT DOCUMENTS

WO    2013067219 A2    5/2013

OTHER PUBLICATIONS

3rd Generation Partnership Project, 3GPP TS 26.346, V13.5.0 (Jun. 2016), provided via IDS as published Jun. 2016 (Year: 2016).*
3rd Generation Partnership Project; Technical Specification Group Services and System Aspects; Multimedia Broadcast /Multicast Service (MBMS); Protocols and codecs (Release 13); 3GPP TS 26.346, V13.5.0, Jun. 2016, 237 pp.

(Continued)

*Primary Examiner* — Tyler J Torgrimson
(74) *Attorney, Agent, or Firm* — The Marbury Law Group, PLLC (57) ABSTRACT

Systems, methods, and devices of various embodiments enable signaling one or more capabilities of servers, such as web servers or content delivery network (CDN) servers, to use file version information, such as MD5s (message digest 5 (MD5) algorithm hash values) and/or entity tags (ETags), to computing devices for byte-range file repair.

12 Claims, 10 Drawing Sheets

(56) References Cited

OTHER PUBLICATIONS

Anonymous: 11 HTTP ETag—Wikipedia 11, 6' Jun. 2016 (Jun. 6, 2016), XP055399032, Retrieved from the Internet: URL: https://en.wikipedia.orgfw/index.php?title=HTTPETag&oldid=723995067 [retrieved on Aug. 16, 2017] Section 11 Deployment risks 11, pp. 3.
International Search Report and Written Opinion—PCT/US2017/035927—ISA/EPO—Aug. 24, 2017.
Luby, et al., "Flute—File Delivery over Unidirectional Transport", IETF RFC 3926, Oct. 2004, pp. 1-35.

\* cited by examiner

| GET | /service1/news_service/latest_news.mp4 | HTTP/1.1 |
| If-Match: | "10690a1-4f2-40d45ae1" | |
| Range: | bytes=50186-50486,190370-190570 | |
| Host: | www.example.com | |

704

| GET | /service1/news_service/latest_news.mp4 | HTTP/1.1 |
| If-Match: | "B2B359591E961C6B0F468FE536BCD920=" | |
| Range: | bytes=50186-50486,190370-190570 | |
| Host: | www.example.com | |

706

| GET | /service1/news_service/latest_news.mp4 | HTTP/1.1 |
| Range: | bytes=50186-50486,190370-190570 | |
| Host: | www.example.com | |

SIGNALING WHICH VERSION INFORMATION TO USE ON BYTE-RANGE FILE REPAIR

RELATED APPLICATIONS

The present application claims priority to U.S. Provisional Patent Application No. 62/351,979 entitled "Signaling Which Version Information To Use On Byte-Range File Repair" filed Jun. 19, 2016, the entire contents of which are hereby incorporated by reference.

BACKGROUND

During network transport of digital files, such as video fragments or pieces that are sent in individual files called segments, various events or errors (e.g., tune-away, radio channel errors, etc.) can occur that result in only partial files being received. For example, current evolved Multimedia Broadcast Multicast Service (eMBMS) middleware on a computing device may only receive a partial file due to transmission errors between the Broadcast Multimedia Service Center (BMSC) sending the file and the computing device receiving the file. In some networks, byte-range file repair can be used to attempt to repair a file when only a partial file is received by a computing device. Version information for the file being requested can allow a server to distinguish between multiple versions of a file hosted by the server and return missing source symbols to the computing device matching the requested file version.

SUMMARY

The systems, methods, and devices of the various embodiments enable signaling one or more capabilities of servers, such as web servers or content delivery network (CDN) servers, to use file version information, such as MD5s (message digest 5 (MD5) algorithm hash values) and/or entity tags (ETags), to computing devices for byte-range file repair.

Various embodiments may include determining whether a description of a service includes an ETag value for a file in response to determining that byte-range file repair is needed to repair the file by a computing device and generating a partial Hypertext Transfer Protocol (HTTP) request for byte-range file repair including the ETag value in an If-Match header element in response to determining that the description of the service includes the ETag value.

Various embodiments may include generating a description of a service providing a file indicating a capability of a server hosting the file to use an ETag value and sending the description of the service to a computing device such that the computing device determines whether the description of the service includes the ETag value in response to determining that byte-range file repair is needed and the computing device generates a partial HTTP GET request for byte-range file repair including the ETag value in an If-Match header element in response to determining that the description of the service includes the ETag value.

Further embodiments include a computing device having a processor configured with processor-executable instructions to perform operations of the methods summarized above. Further embodiments include a computing device including means for performing functions of the methods summarized above. Further embodiments include a non-transitory processor-readable storage medium having stored thereon processor-executable instructions configured to cause a computing device processor to perform operations of the methods summarized above. Further embodiments include a server configured with processor executable instructions to perform operations of the methods summarized above. Further embodiments include a server including means for performing functions of the methods summarized above. Further embodiments include a non-transitory processor-readable storage medium having stored thereon processor-executable instructions configured to cause a server processor to perform operations o of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), and similar personal electronic devices which include a programmable processor and memory and circuitry for receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

In current eMBMS networks operating according to the 3$^{rd}$ Generation Partnership Project (3GPP) Technical Specification (TS) 26.346 release 13, files may be transmitted to computing devices via the Multimedia Broadcast Multicast Service (MBMS) download delivery method using the protocol defined in Internet Engineering Task Force (IETF) Request for Comments (RFC) 6726 "FLUTE—File Delivery over Unidirectional Transport" (FLUTE). In such current eMBMS networks, byte-range file repair may be used to attempt to repair a file when only a partial file is received by a computing device. In response to determining only a partial file is received, the computing device may send a partial Hypertext Transfer Protocol (HTTP) GET request as described in the Network Working Group RFC 2616 "Hypertext Transfer Protocol—HTTP/1.1" via unicast to a server, such as a web server of content delivery network (CDN) server, hosting the file that was only partially received. The partial HTTP GET request may request the missing source symbols for the partial file. For example, the request header of the partial HTTP GET request may include a list of byte-ranges of the original file that match the missing source symbols of the partial file.

When a message digest (MD) algorithm hash value, such as an MD5 hash value (referred to herein for ease of reference merely as an MD5), for the file is included in the file's description on the File Delivery Table (FDT) for a service, the partial HTTP GET request includes the MD5 as an entity tag (ETag) in the If-Match header element of the partial HTTP GET request. In this manner, the MD5 may serve as a version number for the file being requested, enabling a server, such as web server or CDN server, to distinguish between multiple versions of a file hosted by the server. In response to determining a version of the file hosted by the server, such as the web server or CDN server, matches the requested version based on the MD5, the server returns the requested missing source symbols to the requesting computing device. In response to determining no version of the file hosted by the server, such as the web server or CDN server, matches the requested version based on the MD5, the server returns a 412 "Precondition Failed" reply to the requesting computing device.

Not all servers, such as web servers or CDN servers, support using an MD5 as an ETag. Servers, such as web servers or CDN servers, that do not support using an MD5 as an ETag will not recognize partial HTTP GET requests including MD5s as ETags as requests for valid file versions and will return a 412 "Precondition Failed" reply to all partial HTTP GET requests including MD5s as ETags. The return of a 412 "Precondition Failed" reply to all partial HTTP GET requests including MD5s as ETags makes byte-range file repair useless when a server, such as a web server or CDN server, does not support using an MD5 as an ETag.

Various embodiments enable signaling one or more capabilities of servers, such as web servers or CDN servers, to use file version information, such as MD5s and/or ETags, to computing devices for byte-range file repair. By signaling one or more capabilities of servers, such as web servers or CDN servers to use file version information, such as MD5s and/or ETags, various embodiments enable computing devices to generate a partial HTTP GET request for byte-range file repair that may be tailored to one or more capabilities of a specific server hosting a specific file to be repaired. By enabling a computing device to generate a partial HTTP GET request for byte-range file repair that may be tailored to one or more capabilities of a specific server, such as a web server or CDN server, hosting a specific file to be repaired, various embodiments may enable a computing device to send a partial HTTP GET request for byte-range file repair to a server that does not support using an MD5 as an ETag that will not automatically result in the server returning a 412 "Precondition Failed" reply to the partial HTTP GET request.

Various embodiments may signal one or more capabilities of servers, such as web servers or CDN servers, to use file version information, such as MD5s and/or ETags, in a description of a service, such as a FDT and/or Associated Delivery Procedure Description (ADPD) of a service. In various embodiments, a server, such as a Broadcast Multimedia Service Center (BMSC) server, may receive indications of one or more capabilities of servers, such as web servers or CDN servers to use file version information, such as MD5s and/or ETags, and may generate a FDT and/or ADPD signaling the one or more capabilities. For example, a BMSC may receive an indication that a CDN server does not support using MD5s as ETags, and may indicate that the CDN server does not support using MD5s as ETags in the FDT generated for files hosted by that CDN server. As another example, a BMSC may receive an indication that a CDN server does not support using MD5s as ETags, and may indicate that the CDN server does not support using MD5s as ETags in the ADPD generated for a service provisioning files hosted by that CDN server.

In an embodiment, a server, such as a BMSC server, may signal the capability of a server, such as a web server or CDN server, by generating a FDT of a service that may include an ETag of the file. When the server, such as a BMSC server, ingests the file name for the file to be transported over FLUTE, the server may also receive the ETag for the file. The server, such as a BMSC server, may add the file name under a Content-Location attribute of the FDT, add the computed MD5 for the file under a Content-MD5 attribute of the FDT, and add the ETag for the file under a new fileETag attribute of the FDT. In this manner, the fileETag attribute of the FDT may represent the value of the ETag. A computing device may receive the FDT, and when performing byte-range file repair of the file, the computing device may generate the partial HTTP GET request for the file based on the FDT. In response to determining that the fileETag attribute for the file is present in the FDT, the computing device may include the ETag in the If-Match header element of the partial HTTP GET request for byte-range file repair of the file. In response to determining that the fileETag attribute for the file is not present in the FDT, the computing device may generate a HTTP GET request that does not include an If-Match header element.

In an embodiment, a server, such as a BMSC server, may signal the capability of a server, such as a web server or CDN server, by generating a FDT of a service that may include a flag disabling the use of MD5 as ETags on conditional (including If-Match header) partial GET requests. In an embodiment, the flag may disable the use of MD5 as ETags on a per file basis. For example, a flag, such as a true or false indication, in a ByteRangeFileRepair-WithMD5 attribute of file in the FDT may indicate whether or not the server, such as a web server or CDN, hosting that file supports using MD5s as ETags. A computing device may receive the FDT, and when performing byte-range file repair of the file, the computing device may generate the partial HTTP GET request for the file that also includes the If-Match header based on the flag state of the ByteRangeFileRepairWithMD5 attribute of the file in the FDT. As examples, in response to determining that the ByteRangeFileRepairWithMD5 attribute of file in the FDT is set to false (e.g., the server hosting the file does not support MD5s as ETags), the computing device may generate a HTTP GET request that does not include an If-Match header element. In response to determining that the ByteRangeFileRepairWithMD5 attribute of file in the FDT is set to true (e.g., the server hosting the file supports MD5s as ETags), the computing device may include the MD5 as an ETag in the If-Match header element of the partial HTTP GET request for byte-range file repair of the file.

In an embodiment, a server, such as a BMSC server, may signal the capability of a server, such as a web server or CDN server, by generating an ADPD metadata fragment of a service that may include a flag disabling the use of MD5 as ETags. In an embodiment, the flag may disable the use of MD5 as ETags for all files of the service. For example, a flag, such as a true or false indication, in a ByteRangeFileRepairWithMD5 attribute of the ADPD metadata fragment may indicate whether or not the server, such as a web server or CDN, hosting that file supports using MD5s as ETags. A computing device may receive the ADPD metadata fragment and when performing byte-range file repair of the file, the computing device may generate the partial HTTP GET request for the file that also includes the If-Match header based on the flag state of the ByteRangeFileRepairWithMD5 attribute of the ADPD metadata fragment. As examples, in response to determining that the ByteRangeFileRepairWithMD5 attribute of the ADPD metadata fragment is set to false (e.g., the server hosting the file does not support MD5s as ETags), the computing device may generate a HTTP GET request that does not include an If-Match header element. In response to determining that the ByteRangeFileRepairWithMD5 attribute of the ADPD metadata fragment is set to true (e.g., the server hosting the file supports MD5s as ETags), the computing device may include the MD5 as an ETag in the If-Match header element of the partial HTTP GET request for byte-range file repair of the file.

Various examples of different middleware, radio technologies, and transport protocols are discussed herein, specifically eMBMS, FLUTE, and HTTP. The discussions of specifically eMBMS, FLUTE, and HTTP are provided merely as examples to better illustrate the aspects of the various embodiments, and are not intended to limit the various embodiments in any way. Other middleware, radio technologies, and transport protocols may be used with the various embodiments, and the other middleware, radio technologies, and transport protocols may be substituted in the various examples without departing from the spirit or scope of the invention.

Figure 1:
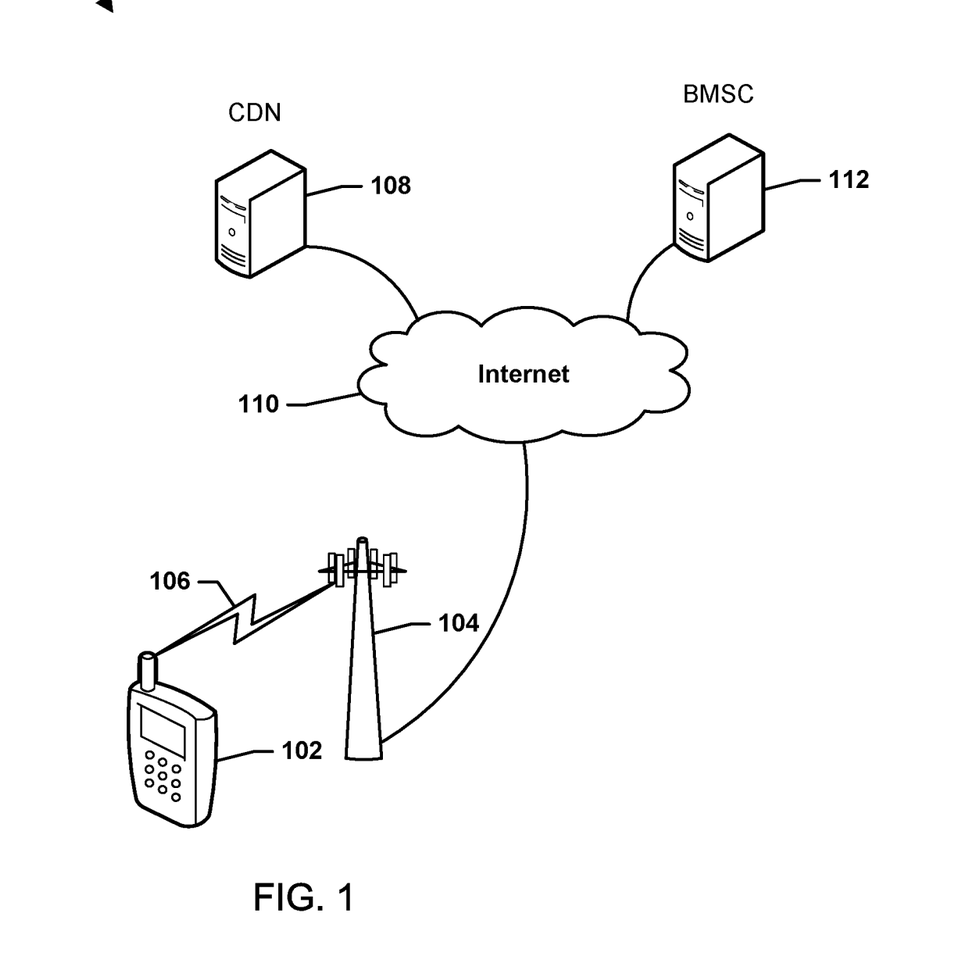
FIG. 1 is a communication system block diagram of a network suitable for use with the various embodiments.

FIG. 1 illustrates a cellular network system 100 suitable for use with the various embodiments. The cellular network system 100 may include multiple devices, such as a computing device 102, one or more cellular towers or base stations 104, and servers 108 and 112 connected to the Internet 110. The computing device 102 may exchange data via one or more cellular connections 106, including Code Division Multiple Access (CDMA), Time Division Multiple Access (TDMA), Global System for Mobile Communications (GSM), Personal Communication Service (PCS), Third Generation (3G), Fourth Generation (4G), Long Term Evolution (LTE), or any other type connection, with the cellular tower or base station 104. The cellular tower or base station 104 may be in communication with a router that may connect to the Internet 110. In this manner, via the connections to the cellular tower or base station 104, and/or Internet 110, data may be exchanged between the computing device 102 and the server(s) 108 and 112. In an embodiment, server 108 may be a web server or content provider server, such as a Content Delivery Network (CDN) server, providing files for delivery to computing devices, such as computing device 102. In an embodiment, server 112 may be a Broadcast Multimedia Service Center (BMSC) server that may receive files, such as files from server 108, and control the Over-the-Air (OTA) transmission of the files to the computing device 102. For example, server 112 may transmit files to the computing device 102 via MBMS download delivery method using the FLUTE protocol. Of course, while features of computing devices, such as computing device 102, described herein may be described with reference to OTA transmissions, these features may be used in connection with wired transmissions, wireless transmissions, or a combination of wired and wireless transmissions. Thus, OTA transmission is not required.

Figure 2:
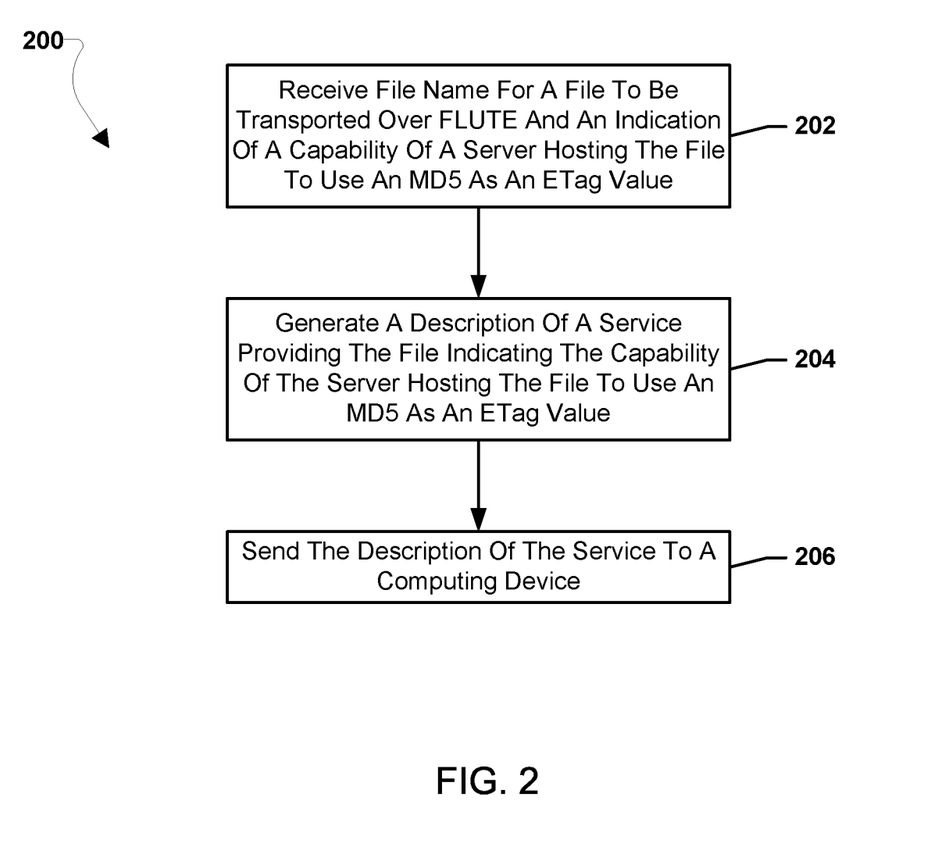
FIG. 2 is a process flow diagram illustrating an embodiment method for signaling a capability of a server.

FIG. 2 illustrates an embodiment method 200 for signaling a capability of a server, such as a web server or CDN server. In an embodiment, the operations of method 200 may be performed by a server in an eMBMS network, such as a BMSC. In block 202, the server may receive a file name for a file to be transported over FLUTE and an indication of a capability of a server hosting the file to use an MD5 as an ETag value. For example, when a BMSC server ingests the file name for the file to be transported over FLUTE, the BMSC server may also receive an indication of whether the server hosting that file supports MD5s as ETags. In some embodiments, the indication that the server supports using MD5s as ETags may be the receipt of the ETag for the file itself at the BMSC.

In block 204 the server may generate a description of the service providing the file hosted by the server indicating the capability of the server hosting the file to use the MD5 as an ETag value. In various embodiments, the description of the service may be a FDT. For example, the server, such as a BMSC server, may add the file name under a Content-Location attribute of the FDT, add the computed MD5 for the file under a Content-MD5 attribute of the FDT, and add the ETag for the file under a fileETag attribute of the FDT. As another example, the server may generate a FDT of the service that may include a flag disabling the use of MD5 as ETags, such as a true or false indication, in a ByteRange-FileRepairWithMD5 attribute of file in the FDT indicating whether or not the server, such as a web server or CDN, hosting that file supports using MD5s as ETags. In various embodiments, the description of the service may include an Associated Delivery Procedure Description (ADPD) metadata fragment that describes associated delivery procedures such as file repair of partially received files. For example, the server, such as a BMSC server, may generate an ADPD metadata fragment of a service that may include a flag disabling the use of MD5 as ETags, such as a true or false indication, in a ByteRangeFileRepairWithMD5 attribute on the file repair component of the ADPD metadata fragment indicating whether or not the server, such as a web server or CDN, hosting that file supports using MD5s as ETags.

In block 206 the server may send the description of the service to a computing device. In various embodiments, the description of the service may be sent via one or more OTA transmissions to a computing device in via an eMBMS network.

Figure 3:
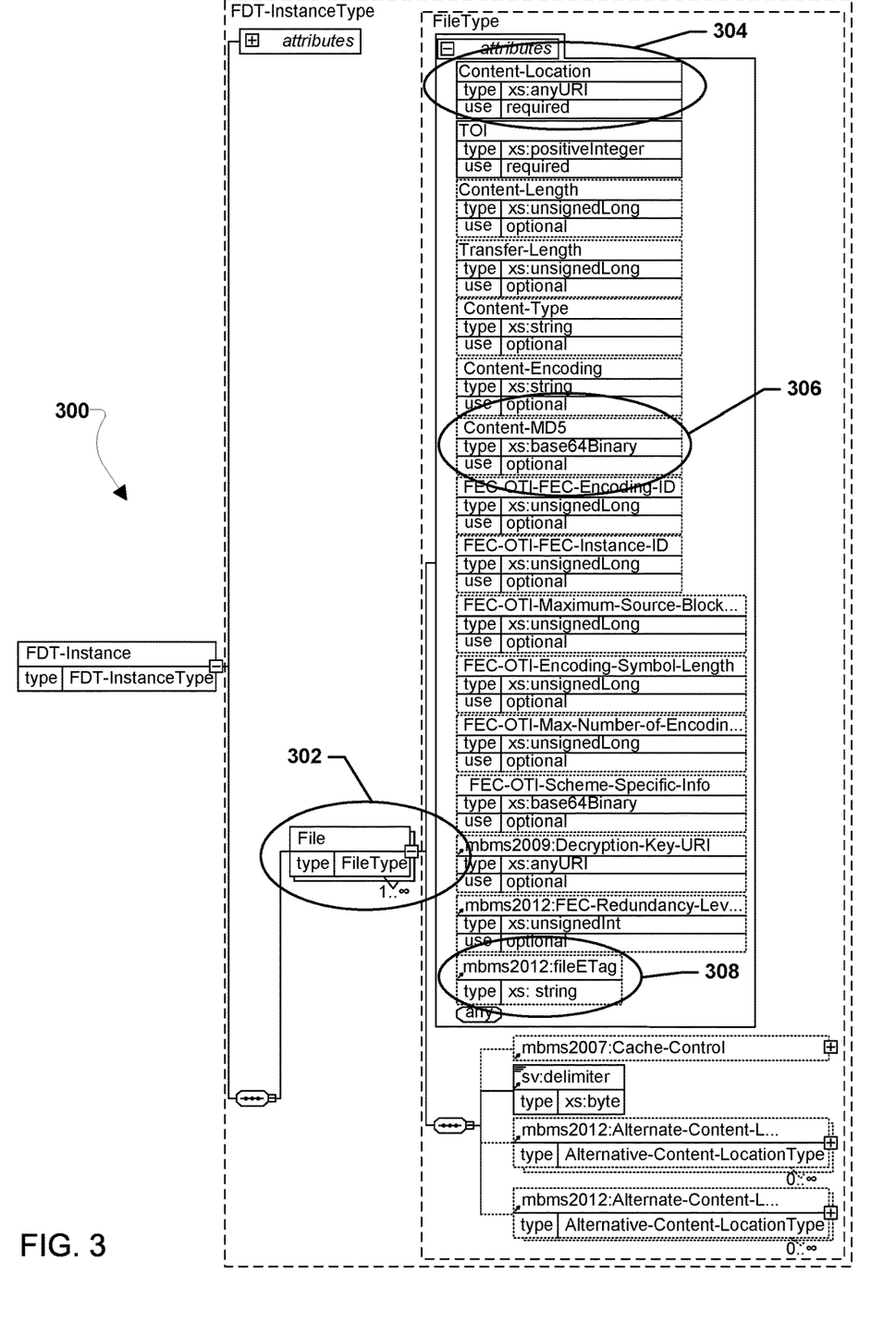
FIG. 3 illustrates an example File Delivery Table (FDT) schema according to an embodiment.

FIG. 3 illustrates an example FDT 300 schema according to an embodiment. In various embodiments, the FDT 300 may be generated according to the operations of method 200 described with reference to FIG. 2. For each file 302 indicated in the FDT 300, the FDT 300 may include the file name under a Content-Location attribute 304, the computed MD5 for the file under a Content-MD5 attribute 306, and the ETag for the file under a new fileETag attribute 308.

Figure 4:
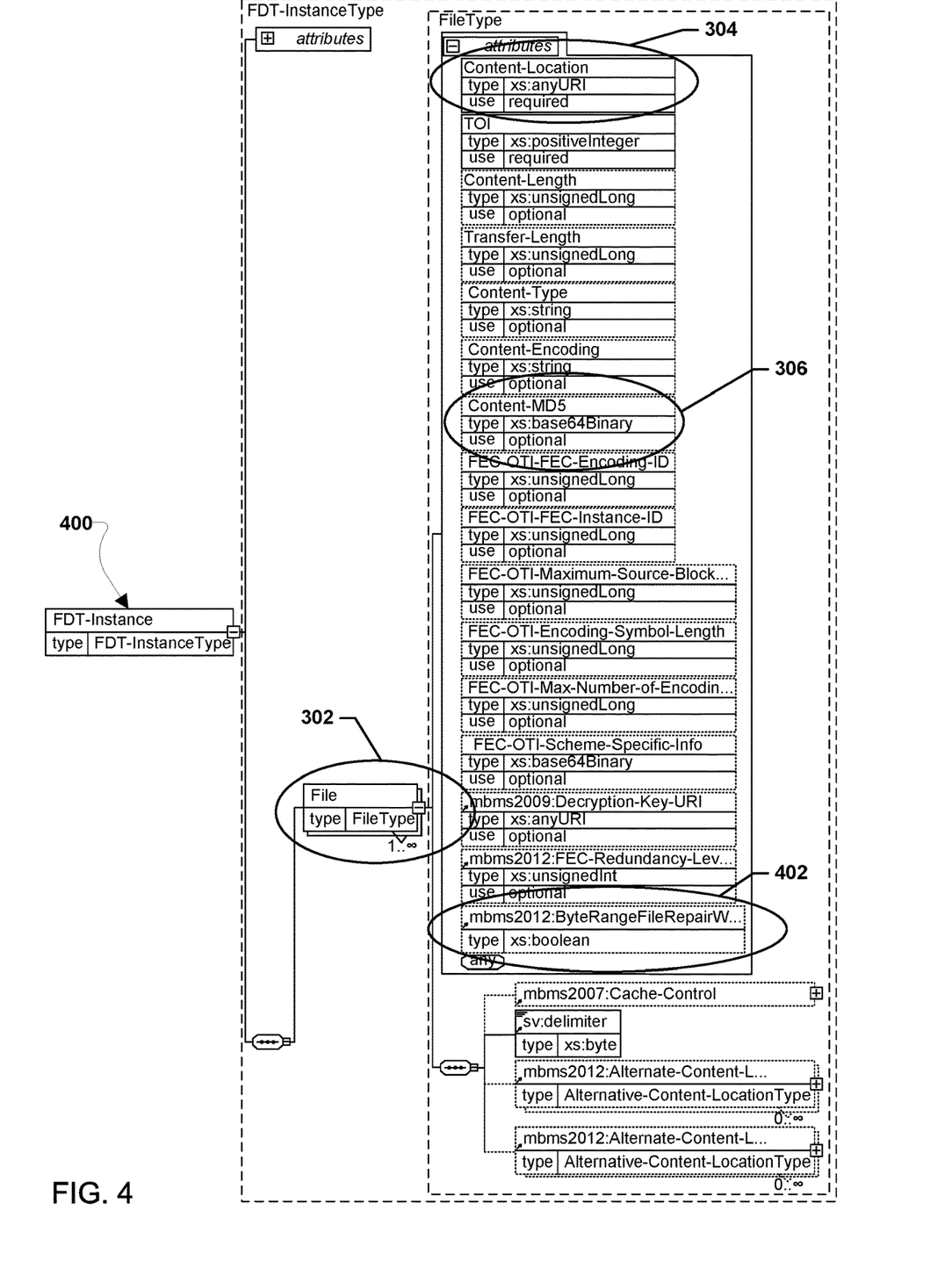
FIG. 4 illustrates an example FDT schema according to an embodiment.

FIG. 4 illustrates an example FDT 400 schema according to an embodiment. In various embodiments, the FDT 400 may be generated according to the operations of method 200 described with reference to FIG. 2. For each file 302 indicated in the FDT 400, the FDT 400 may include the file name under a Content-Location attribute 304, the computed MD5 for the file under a Content-MD5 attribute 306, and a flag, such as a true or false indication, in a new ByteRangeFileRepairWithMD5 attribute 402. The ByteRangeFileRepairWithMD5 attribute 402 may indicate whether or not the server, such as a web server or CDN, hosting that file supports using MD5s as ETags.

Figure 5:
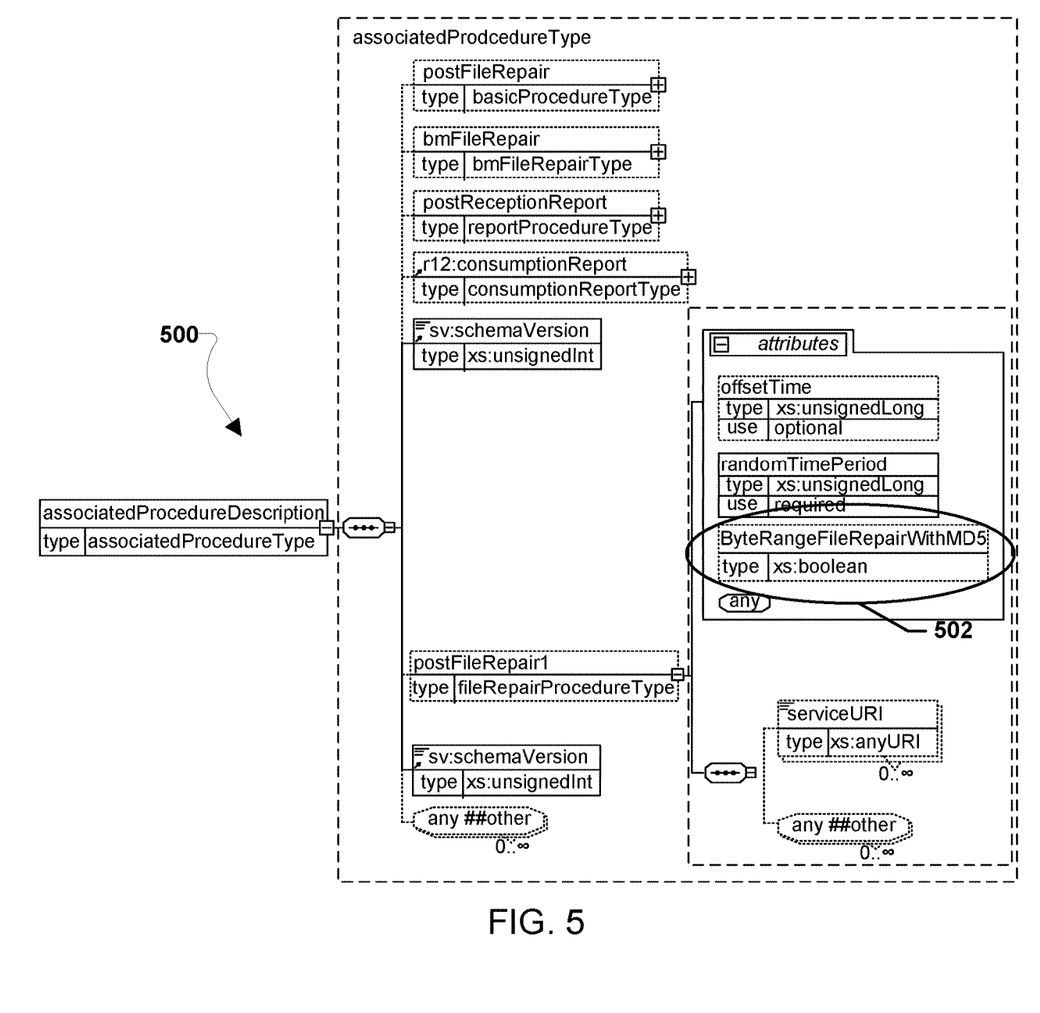
FIG. 5 illustrates an example Associated Delivery Procedure Description (ADPD) schema according to an embodiment.

FIG. 5 illustrates an example ADPD 500 schema according to an embodiment. In various embodiments, the ADPD 500 may be generated according to the operations of method 200 described with reference to FIG. 2. The ADPD 500 may include a flag, such as a true or false indication, in a new ByteRangeFileRepairWithMD5 attribute 502, which may indicate whether or not the server, such as a web server or CDN, hosting that file supports using MD5s as ETags.

Figure 6A:
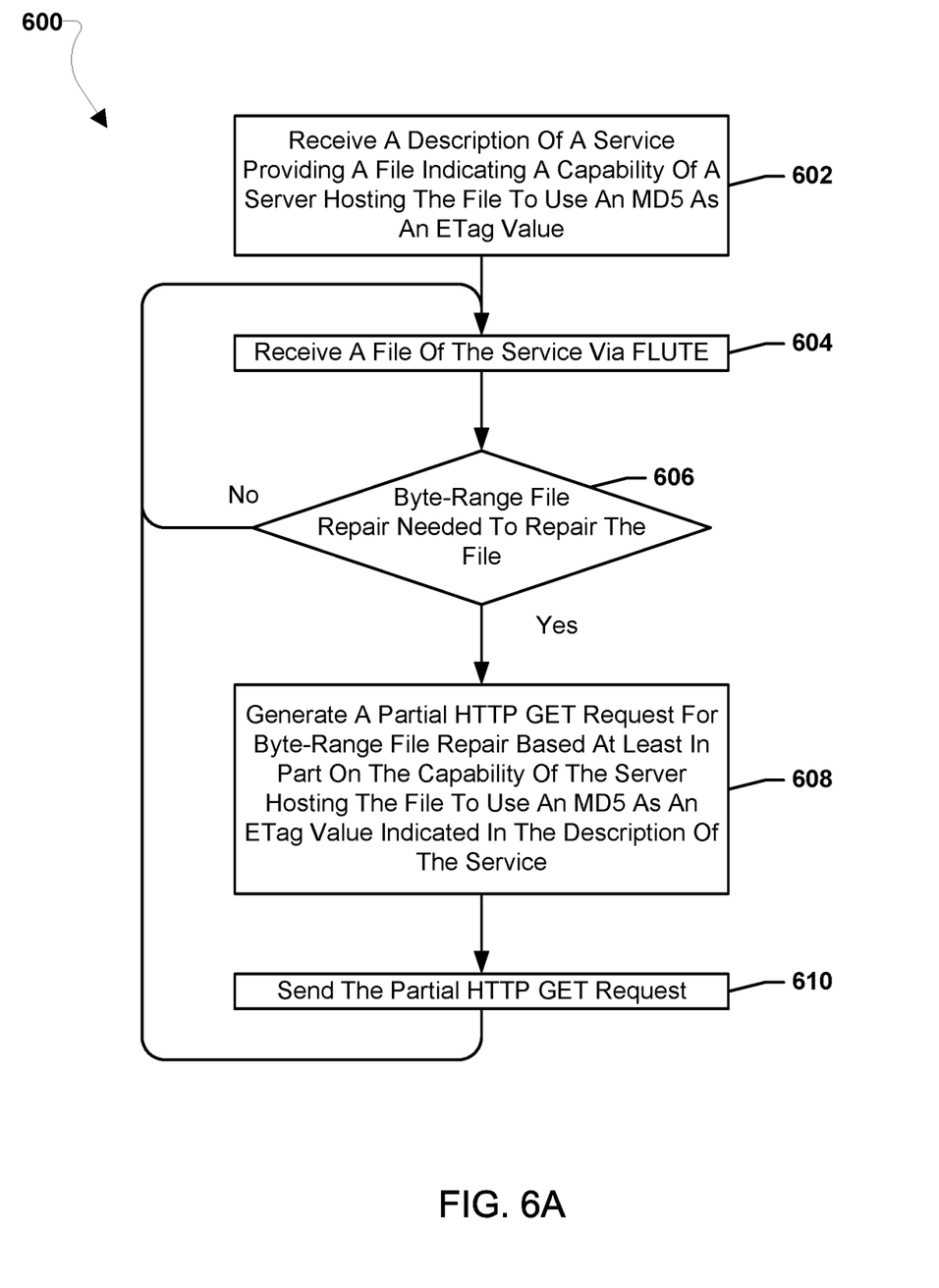
FIG. 6A is a process flow diagram illustrating an embodiment method for supporting byte-range file repair.

FIG. 6A illustrates an embodiment method 600 for supporting byte-range file repair for a partially received file. In an embodiment, the operations of method 600 may be performed by a processor of a computing device in an eMBMS network, such as an eMBMS receiver device.

In block 602, the processor may receive a description of a service providing a file indicating a capability of a server hosting the file to use an MD5 as an ETag value. In various embodiments, the description of the service may be a FDT, such as FDT 300 or FDT 400 described with reference to FIGS. 3 and 4, respectively. In various embodiments, the description of the service may be an ADPD, such as ADPD 500 described with reference to FIG. 5.

In block 604 the processor may receive a file of the service via FLUTE. In determination block 606 the processor may determine whether byte-range file repair is needed to repair the file. For example, the processor may determine whether the file was fully or partially received and whether retrieving source symbols would enable error correction technique to be applied to repair the file. In response to determining that byte range file repair is not needed to repair the file (i.e., determination block 606="No"), the processor may receive the next file of the service in block 604.

In response to determining that byte-range file repair is needed to repair the file (i.e., determination block 606="Yes"), the processor may generate a partial HTTP GET request for byte-range file repair based at least in part on the capability of the server hosting the file to use an MD5 as an ETag value indicated in the description of the service in block 608.

In an embodiment, the description of the service may be an FDT including an ETag, such as FDT 300 described with reference to FIG. 3, and generating a partial HTTP GET request for byte-range file repair based at least in part on the capability of the server hosting the file to use an MD5 as an ETag indicated in the FDT may include determining whether the FDT of the service includes the ETag. In response to determining that the FDT of the service includes the ETag, the processor may generate a partial HTTP GET including the ETag in an If-Match header element of the partial HTTP GET request. In response to determining that the FDT of the service does not include the ETag, the processor may generate a partial HTTP GET request without including an If-Match header element in the partial HTTP GET request.

In an embodiment, description of the service may be an FDT including an attribute indicating whether or not the server hosting the file supports using the MD5 as the ETag, such as FDT 400 described with reference to FIG. 4, and generating a partial HTTP GET request for byte-range file repair based at least in part on the capability of the server hosting the file to use an MD5 as an ETag indicated in the FDT may include determining whether the attribute of the FDT indicates the server supports using the MD5 as the ETag. In response to determining that the attribute of the FDT indicates the server supports using the MD5 as the ETag, the processor may generate a partial HTTP GET including the MD5 in an If-Match header element of the partial HTTP GET request. In response to determining that the attribute of the FDT indicates the server does not support using the MD5 as the ETag, the processor may generate a partial HTTP GET request without including an If-Match header element in the partial HTTP GET request.

In an embodiment, description of the service may be an ADPD including an attribute indicating whether or not the server hosting the file supports using the MD5 as the ETag, such as ADPD 500 described with reference to FIG. 5, and generating a partial HTTP GET request for byte-range file repair based at least in part on the capability of the server hosting the file to use an MD5 as an ETag indicated in the ADPD may include determining whether the attribute of the ADPD indicates the server supports using the MD5 as the ETag. In response to determining that the attribute of the ADPD indicates the server supports using the MD5 as the ETag, the processor may generate a partial HTTP GET including the MD5 in an If-Match header element of the partial HTTP GET request. In response to determining that the attribute of the ADPD indicates the server does not support using the MD5 as the ETag, the processor may generate a partial HTTP GET request without including an If-Match header element in the partial HTTP GET request.

In block 610 the processor may send the partial HTTP GET request. For example, the processor may send a unicast request to the host of the file. The processor may proceed to block 604 to receive the next file of the service via FLUTE.

Figure 6B:
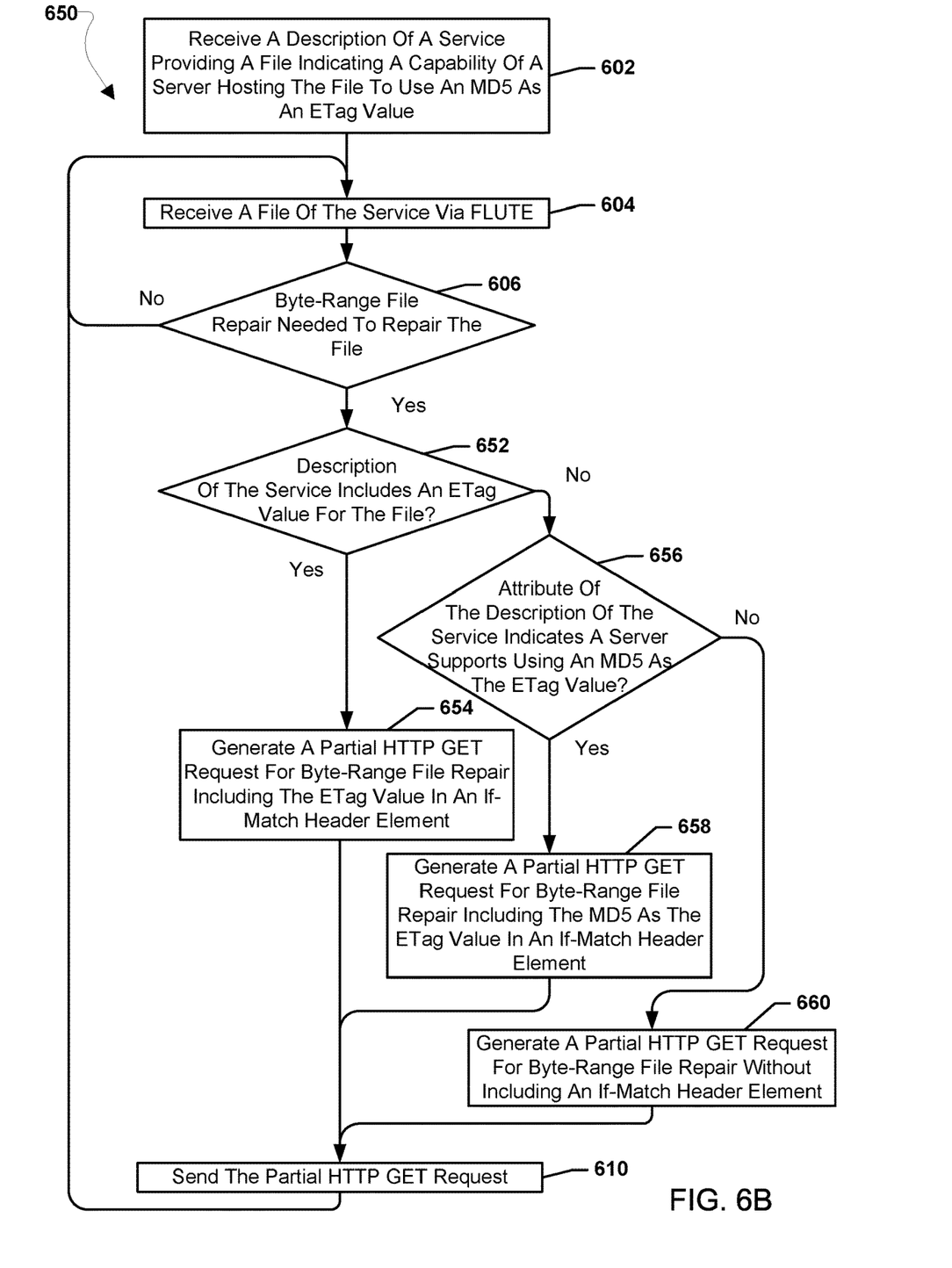
FIG. 6B is a process flow diagram illustrating another embodiment method for supporting byte-range file repair.

FIG. 6B illustrates an embodiment method 650 for supporting byte-range file repair for a partially received file. In an embodiment, the operations of the method 650 may be performed by a processor of a computing device in an eMBMS network, such as an eMBMS receiver device.

In block 602, the processor may receive a description of a service providing a file indicating a capability of a server hosting the file to use an MD5 as an ETag. In some embodiments, the description of the service may be an FDT, such as FDT 300 or FDT 400 described with reference to FIGS. 3 and 4, respectively. In some embodiments, the description of the service may be an ADPD, such as ADPD 500 described with reference to FIG. 5.

In block 604 the processor may receive a file of the service via FLUTE. In determination block 606 the processor may determine whether byte-range file repair is needed to repair the file. For example, the processor may determine whether the file was fully or partially received and whether retrieving source symbols would enable error correction techniques to be applied to repair the file. In response to determining that byte range file repair is not needed to repair the file (i.e., determination block 606="No"), the processor may receive the next file of the service in block 604.

In response to determining that byte-range file repair is needed to repair the file (i.e., determination block 606="Yes"), the processor may determine whether the description of the service includes an ETag value for the file in determination block 652. Descriptions of a service, such as FDTs, APDPs, etc., may include an ETag as an attribute of the description of the service. For example, an ETag may be included as a fileETag attribute in a FDT. Not all descriptions of a service may include an ETag. The processor may crawl or otherwise scan the attributes of the description of the service to determine whether the description of the service includes an ETag.

In response to determining that the description of the service includes an ETag value (i.e., determination block 652="Yes"), the processor may generate a partial HTTP GET request for byte-range file repair including the ETag value in an If-Match header element in block 654.

In response to determining that the description of the service does not include an ETag value (i.e., determination block 652="No"), the processor may determine whether an attribute of the description of the service indicates a server supports using an MD5 as the ETag value in determination block 656. Descriptions of a service, such as FDTs, APDPs, etc., may include an MD5 as an attribute of the description of the service which may indicate the server supports using an MD5 as an ETag. For example, a computed MD5 for a file may be included under a Content-MD5 attribute of an FDT to indicate the server supports using an MD5 as an ETag. Not all descriptions of a service may include a MD5. The processor may crawl or otherwise scan the attributes of the description of the service to determine whether an MD5 is present and server therefore supports using an MD5 as an ETag.

In response to determining that the description of the service indicates that the server does support using an MD5 as an ETag value (i.e., determination block 656="Yes"), the processor may generate a partial HTTP GET request for byte-range file repair including the MD5 in an If-Match header element in block 658.

In response to determining that the description of the service indicates the server does not support using an MD5 as an ETag value (i.e., determination block 656="No"), the processor may generate a partial HTTP GET request without including an If-Match header element in block 660.

Figure 7:
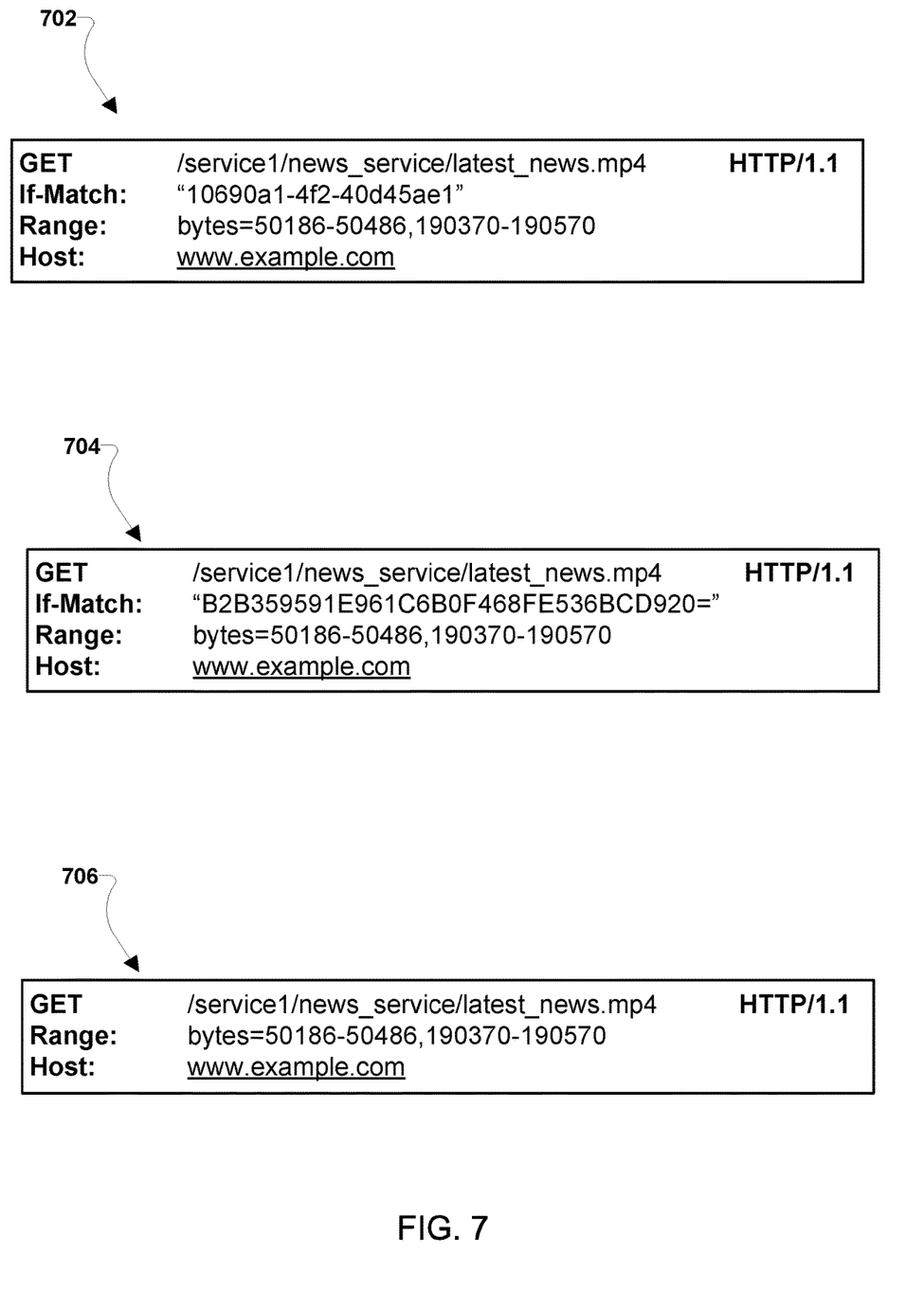
FIG. 7 illustrates example schemas of headers of partial Hypertext Transfer Protocol (HTTP) GET requests according to various embodiments.

Following generation of a partial HTTP GET request in any of blocks 654, 658 or 660, the processor may send the partial HTTP GET request in block 610. For example, the processor may send a unicast request to the host of the file. The processor may proceed to block 604 to receive the next file of the service via FLUTE FIG. 7 illustrates example schemas of headers of partial HTTP GET requests according to various embodiments. Partial HTTP GET request header 702 points to the file to be repaired "/service1/news_service/latest_news.mp4" and includes the Uniform Resource Indicator (URI) value for the file host "www.example.com" indicated in the Alternate-Content-Location element in the FDT for the service. The partial HTTP GET request header 702 also includes the If-Match element including the value equal to the ETag indicated in the FDT. The format for the ETag illustrated in partial HTTP GET request header 702 is in Apache server format "Inode-Size-Mtime." The partial HTTP GET request header 702 also includes the range header element including all byte ranges that are being requested.

Partial HTTP GET request header 704 points to the file to be repaired "/service1/news_service/latest_news.mp4" and includes the Uniform Resource Indicator (URI) value for the file host "www.example.com" indicated in the Alternate-Content-Location element in the FDT for the service. The partial HTTP GET request header 704 also includes the If-Match element including the value equal to the MD5 indicated in the FDT. The format for the MD5 illustrated in partial HTTP GET request header 704 may be a Base 64 encoded string. The partial HTTP GET request header 704 also includes the range header element including all byte ranges that are being requested.

Partial HTTP GET request header 706 points to the file to be repaired "/service1/news_service/latest_news.mp4" and includes the Uniform Resource Indicator (URI) value for the file host "www.example.com" indicated in the Alternate-Content-Location element in the FDT for the service. The partial HTTP GET request header 706 does not include an If-Match header element. The partial HTTP GET request header 706 also includes the range header element including all byte ranges that are being requested.

The partial HTTP GET request headers 702, 704, and/or 706 may be included in a partial HTTP GET request generated according to the operations of methods 600 and 650 described with reference to FIGS. 6A and 6B. For example, partial HTTP GET request header 702 may be included in a partial HTTP GET request for byte-range file repair in response to determining that an FDT of the service includes the ETag for the file to be repaired. As another example, partial HTTP GET request header 704 may be included in a partial HTTP GET request for byte-range file repair in response to determining that an attribute of the FDT or an attribute of the ADPD indicates the server hosting the file to be repaired supports using the MD5 as the ETag. As a further example, partial HTTP GET request header 706 may be included in a partial HTTP GET request for byte-range file repair in response to determining that an FDT of the service does not include the ETag for the file to be repaired. As a still further example, partial HTTP GET request header 706 may be included in a partial HTTP GET request for byte-range file repair in response to determining that an attribute of an FDT or an ADPD does not indicate the server hosting the file to be repaired supports using the MD5 as the ETag.

Figure 8:
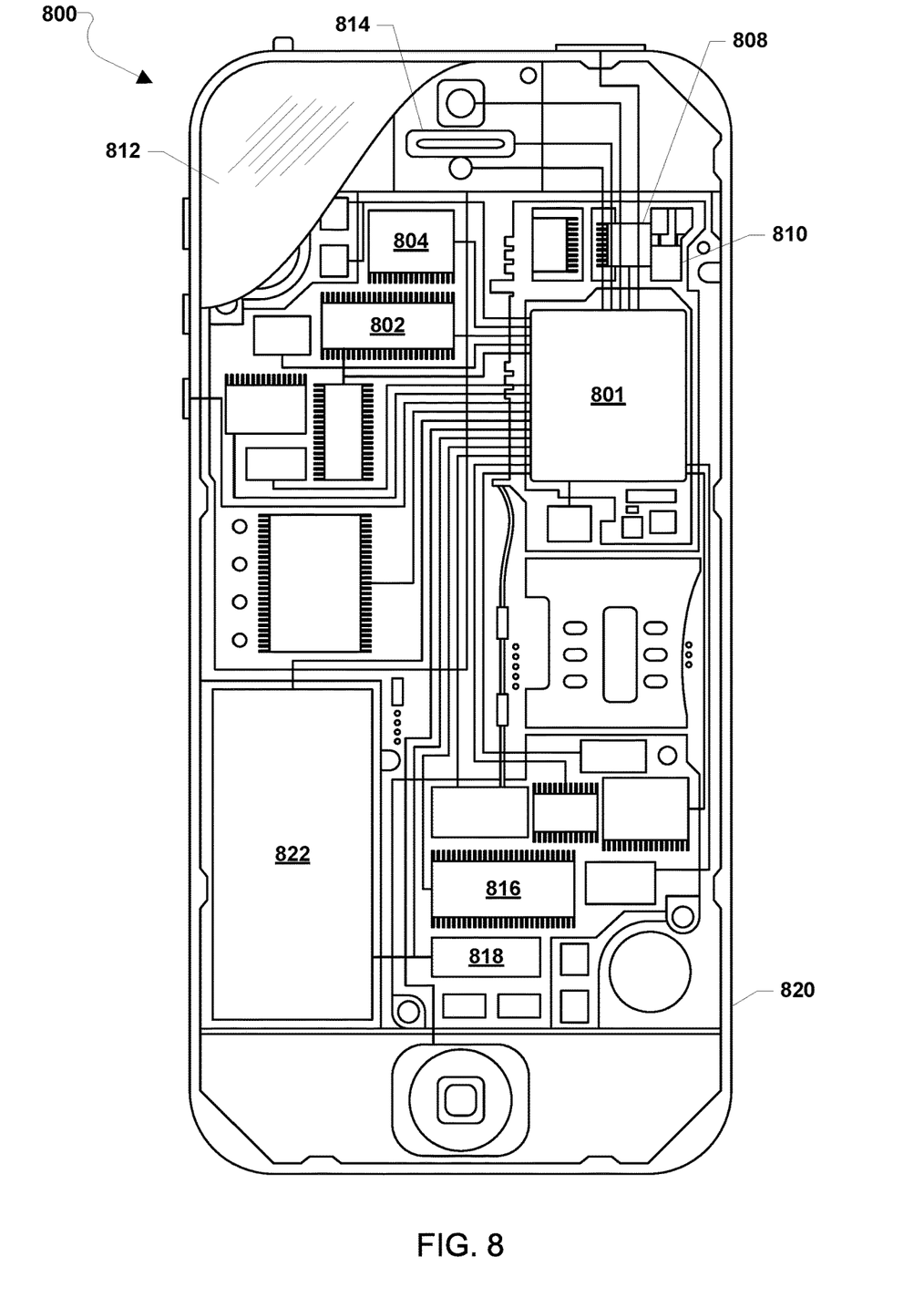
FIG. 8 is a component diagram of an example computing device suitable for use with the various embodiments.

The various embodiments (including, but not limited to, embodiments discussed above with reference to FIGS. 2-7) may be implemented in any of a variety of computing devices (i.e., receiver devices), an example of which is illustrated in FIG. 8. For example, the computing device 800 may include a processor 801 coupled to a touch screen controller 804 and an internal memory 802. The processor

801 may be one or more multicore integrated circuits (ICs) designated for general or specific processing tasks. The internal memory 802 may be volatile or non-volatile memory, and may also be secure and/or encrypted memory, or unsecure and/or unencrypted memory, or any combination thereof. The touch screen controller 804 and the processor 801 may also be coupled to a touch screen panel 812, such as a resistive-sensing touch screen, capacitive-sensing touch screen, infrared sensing touch screen, etc.

The computing device 800 may have one or more radio signal transceivers 808 (e.g., Peanut®, Bluetooth®, ZigBee®, Wi-Fi, cellular, etc.) and antennae 810, for sending and receiving, coupled to each other and/or to the processor 801. The transceivers 808 and antennae 810 may be used with the above-mentioned circuitry to implement the various wireless transmission protocol stacks and interfaces. The computing device 800 may include a cellular network wireless modem chip 816 that enables communication via a cellular network and is coupled to the processor.

The computing device 800 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown).

The computing device 800 may also include speakers 814 for providing audio outputs. The computing device 800 may also include a housing 820, constructed of a plastic, metal, or a combination of materials, for containing all or some of the components discussed herein. The computing device 800 may include a power source 822 coupled to the processor 801, such as a disposable or rechargeable battery. The rechargeable battery may also be coupled to the peripheral device connection port to receive a charging current from a source external to the computing device 800.

Figure 9:
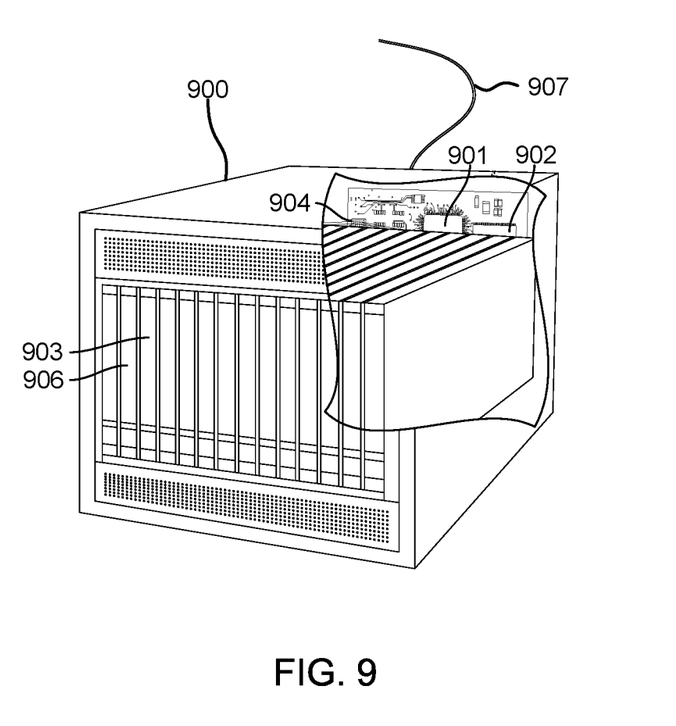
FIG. 9 is a component diagram of an example server suitable for use with the various embodiments.

The various embodiments (including, but not limited to, embodiments discussed above with reference to FIGS. 2-7) may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 904. The server 900 may also include a floppy disc drive, compact disc (CD) or digital versatile disc (DVD) drive 906 coupled to the processor 901. The server 900 may also include one or more network transceivers 903, such as a network access port, coupled to the processor 901 for establishing network interface connections with a communication network 907, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 801 and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 801 and 901. The processors 801 and 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 801 and 901 including internal memory or removable memory plugged into the device and memory within the processors 801 and 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computing device, comprising:
    a processor configured with processor-executable instructions to perform operations comprising:
        determining whether a description of a service includes an entity tag (ETag) value for a file in response to determining that byte-range file repair is needed to repair the file wherein the description of the service is an Associated Delivery Procedure Description (ADPD) metadata fragment;
        generating a partial Hypertext Transfer Protocol (HTTP) GET request for byte-range file repair including the ETag value in an If-Match header element in response to determining that the description of the service includes the ETag value;
        determining whether an attribute of the ADPD metadata fragment indicates a server supports using an MD5 as the ETag value in response to determining that the ADPD metadata fragment does not include the ETag value; and
        generating a partial HTTP GET request for byte-range file repair including the MD5 as the ETag value in an If-Match header element in response to determining that the attribute of the ADPD metadata fragment indicates the server supports using the MD5 as the ETag value.

2. The computing device of claim 1, wherein the description of the service is a File Delivery Table (FDT).

3. The computing device of claim 1, wherein the processor is configured with processor-executable instructions to perform operations further comprising:
    generating a partial HTTP GET request for byte-range file repair without including an If-Match header element in response to determining that the attribute of the ADPD metadata fragment does not indicate the server supports using the MD5 as the ETag value.

4. The computing device of claim 3, wherein the service is an evolved Multimedia Broadcast Multicast Service (eMBMS) service.

5. A method, comprising:
    determining, at a computing device, whether a description of a service includes an entity tag (ETag) value for a file in response to determining that byte-range file repair is needed to repair the file by the computing device, wherein the description of the service is an Associated Delivery Procedure Description (ADPD) metadata fragment;
    generating, at the computing device, a partial Hypertext Transfer Protocol (HTTP) GET request for byte-range file repair including the ETag value in an If-Match header element in response to determining that the description of the service includes the ETag value;
    determining whether an attribute of the ADPD metadata fragment indicates a server supports using an MD5 as the ETag value in response to determining that the ADPD metadata fragment does not include the ETag value; and
    generating a partial HTTP GET request for byte-range file repair including the MD5 as the ETag value in an If-Match header element in response to determining that the attribute of the ADPD metadata fragment indicates the server supports using the MD5 as the ETag value.

6. The method of claim 5, wherein the description of the service is a File Delivery Table (FDT).

7. The method of claim 5, further comprising:
    generating, at the computing device, a partial HTTP GET request for byte-range file repair without including an If-Match header element in response to determining that the attribute of the ADPD metadata fragment does not indicate the server supports using the MD5 as the ETag.

8. The method of claim 7, wherein the service is an evolved Multimedia Broadcast Multicast Service (eMBMS) service.

9. A non-transitory processor-readable storage medium having stored thereon processor-executable instructions configured to cause a processor of a computing device to perform operations, comprising:
    determining whether a description of a service includes an entity tag (ETag) value for a file in response to determining that byte-range file repair is needed to repair the file, wherein the description of the service is an Associated Delivery Procedure Description (ADPD) metadata fragment;
    generating a partial Hypertext Transfer Protocol (HTTP) GET request for byte-range file repair including the ETag value in an If-Match header element in response to determining that the description of the service includes the ETag value;
    determining whether an attribute of the ADPD metadata fragment indicates a server supports using an MD5 as the ETag value in response to determining that the ADPD metadata fragment does not include the ETag value; and
    generating a partial HTTP GET request for byte-range file repair including the MD5 as the ETag value in an If-Match header element in response to determining that the attribute of the ADPD metadata fragment indicates the server supports using the MD5 as the ETag value.

10. The non-transitory processor-readable storage medium of claim 9, wherein the stored processor-executable instructions are configured to cause a processor of a computing device to perform operations such that the description of the service is a File Delivery Table (FDT).

11. The non-transitory processor-readable storage medium of claim 9, wherein the stored processor-executable instructions are configured to cause a processor of a computing device to perform operations further comprising:
   generating a partial HTTP GET request for byte-range file repair without including an If-Match header element in response to determining that the attribute of the ADPD metadata fragment does not indicate the server supports using the MD5 as the ETag value.

12. The non-transitory processor-readable storage medium of claim 11, wherein the stored processor-executable instructions are configured to cause a processor of a computing device to perform operations such that the service is an evolved Multimedia Broadcast Multicast Service (eMBMS) service.

* * * * *